US007165288B2

United States Patent
Lai

(10) Patent No.: US 7,165,288 B2
(45) Date of Patent: Jan. 23, 2007

(54) TWIN-LOOP DUST COLLECTOR

(75) Inventor: Jin-Sheng Lai, Hsi Chih (TW)

(73) Assignee: Great Computer Corp., Taipei Hsien (TW)

( * ) Notice: Subject to any disclaimer, the term of this patent is extended or adjusted under 35 U.S.C. 154(b) by 458 days.

(21) Appl. No.: 10/434,090

(22) Filed: May 9, 2003

(65) Prior Publication Data

US 2004/0221414 A1 Nov. 11, 2004

(51) Int. Cl.
*A47L 7/00* (2006.01)

(52) U.S. Cl. .......................................... 15/303; 15/310
(58) Field of Classification Search ............... 15/303, 15/310; 55/428, 429, 319, 426, DIG. 3
See application file for complete search history.

(56) References Cited

U.S. PATENT DOCUMENTS

| 5,906,760 | A  | * | 5/1999 | Robb et al. | ............ | 219/121.67 |
| 6,388,228 | B1 | * | 5/2002 | Lai | ........................ | 219/121.67 |
| 6,881,924 | B1 | * | 4/2005 | Lai | ........................ | 219/121.67 |

\* cited by examiner

*Primary Examiner*—Theresa T. Snider
(74) *Attorney, Agent, or Firm*—Lowe Hauptman & Berner, LLP

(57) ABSTRACT

A twin-loop dust collector comprises: a case with an opening on the upper side thereof, being provided on a lateral side thereof with a vent hole; a net plate provided to cover the opening, one side of the net plate is pivotally connected with the case to allow lifting of the net plate. When the net plate covers the opening, the net plate is transversely mounted to divide the vent hole into two areas; thereby when in air suction, two loops for exhausting air are formed above and below the net plate respectively.

3 Claims, 5 Drawing Sheets

TWIN-LOOP DUST COLLECTOR

BACKGROUND OF THE INVENTION

1. Field of the Invention

The present invention is related to a twin-loop dust collector, and especially to a dust collecting structure able to form an upper loop and a lower loop for exhausting air; it has the effects of scraps discharging, smoke exhausting and fast heat sinking, and is suitable for a laser carving machine or the like to cut or carve cloths, leathers, papers.

2. Description of the Prior Art

Since high-quality laser carving machines were widely used, various laser carving machines specific for leather and cloths have been developed being due to that such machines are easy and fast for cutting. While it is important to remove heat, waste smoke and scraps generated in laser processing especially from those materials with low ignition points and of easiness of burning such as leather, cloths, papers etc. that are more subjected to burning by having waste scraps or by heat to make damage of the processed work pieces, or even to have the danger of inducing fire alarm. Thereby, it is always the subject highly thought of by the manufacturers and users to discharge heat and suck scraps.

Referring to FIG. 1, a conventional dust collector comprises a working platform 1 and a bottom case 2 which is provided on one side thereof with an opening 21 for connecting an external air suction tube 3; air is drawn out on one hand to generate negative pressure in the area beneath the working platform 1 for sucking the leather, cloth or paper to be processed thereabove, and on the other hand, waste scraps will drop into the bottom case 2 when in laser processing and can be drawn out of the bottom case 2 via the external air suction tube 3.

Following elevating of modern techniques of production, laser processing has been not limited to the application of cutting metals, it is very widely applied on acrylic and wooden carving, and even on cutting of leather, cloths and papers. In the designing of a conventional dust collector, air suction is done only at the area beneath the working platform 1 and can only generate sufficient negative pressure to suck the leather, cloth or paper thereabove. This is still insufficient in discharging scraps; because leathers, cloths or papers are combustible materials, and the processed work pieces made of them are dealt with in a state of lying flat, the vent holes of the working plane of an article are blocked, air exhausting can only be done by adding a peripheral vent hole. However, sometimes the area of an article is larger, during processing, the waste scraps scattered onto the article are unable to be removed in time, so that when in cutting, sparks created at high temperatures tend to cause burning of the waste scraps. This may affect the quality of processing, and even may induce a serious conflagration.

And more, such air suction mode with a single opening is very hard to remove the smoke and scraps emitted in processing, hence dust content in the air gets higher, the environment of working become worse relatively; this will affect the accuracy of laser processing.

In view of the above conventional defects to be solved, the present invention is provided.

SUMMARY OF THE INVENTION

The primary object of the present invention is to provide a twin-loop dust collector able to form an upper loop and a lower loop for exhausting air; it has the effects of scrap discharging, smoke exhausting and fast heat sinking.

To get the above stated object, the twin-loop dust collector of the present invention comprises: a case with an opening on the upper side thereof, the case is provided on a lateral side thereof with a vent hole; a net plate is provided to cover the opening, one side of the net plate is pivotally connected with the case to allow lifting of the net plate. The net plate is transversely mounted to divide the vent hole into two areas; thereby when in air suction, two loops for exhausting air are formed above and below the net plate respectively.

The present invention will be apparent after reading the detailed description of the preferred embodiment thereof in reference to the accompanying drawings.

DETAILED DESCRIPTION OF THE PREFERRED EMBODIMENT

Figure 1:
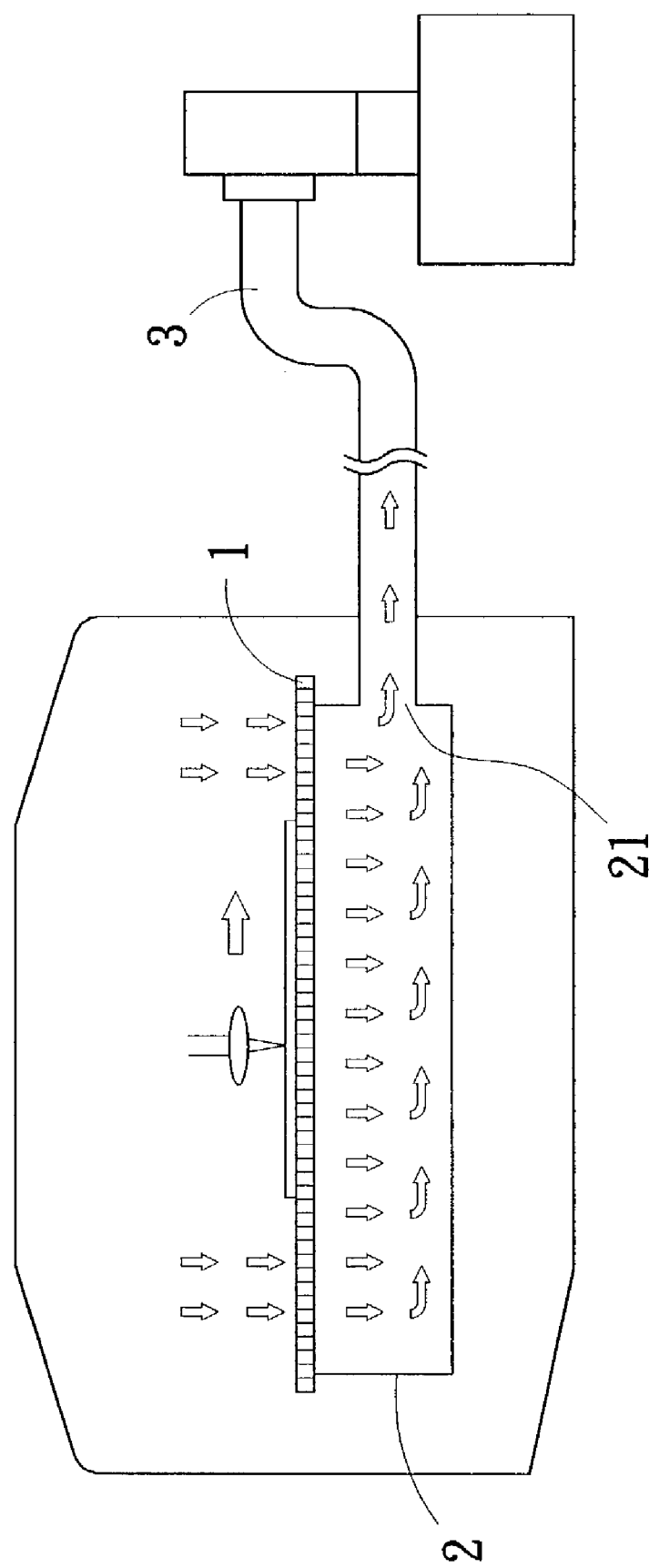
FIG. 1 is a schematic view showing use of a conventional dust collector in air drawing.
Figure 2:
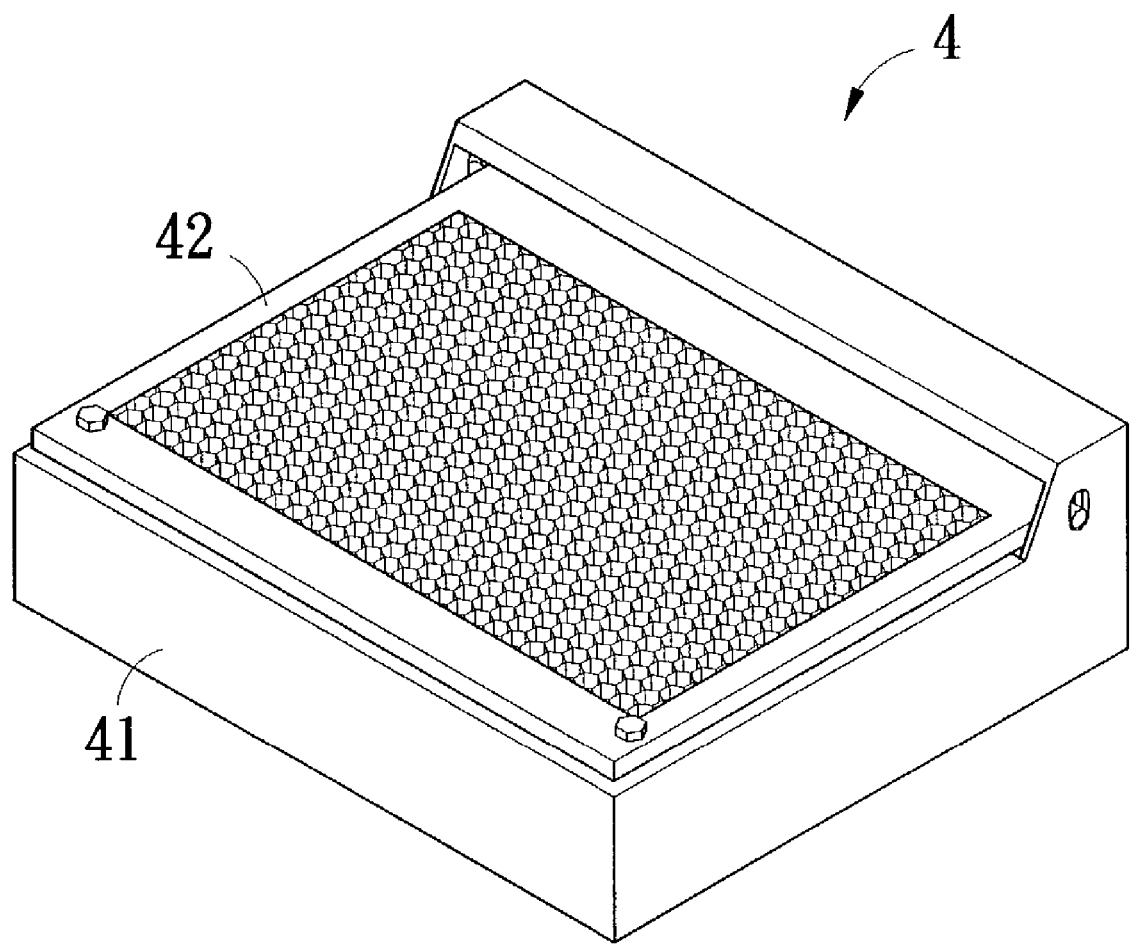
FIG. 2 is a perspective view showing the appearance of the twin-loop dust collector of the present invention.
Figure 3:
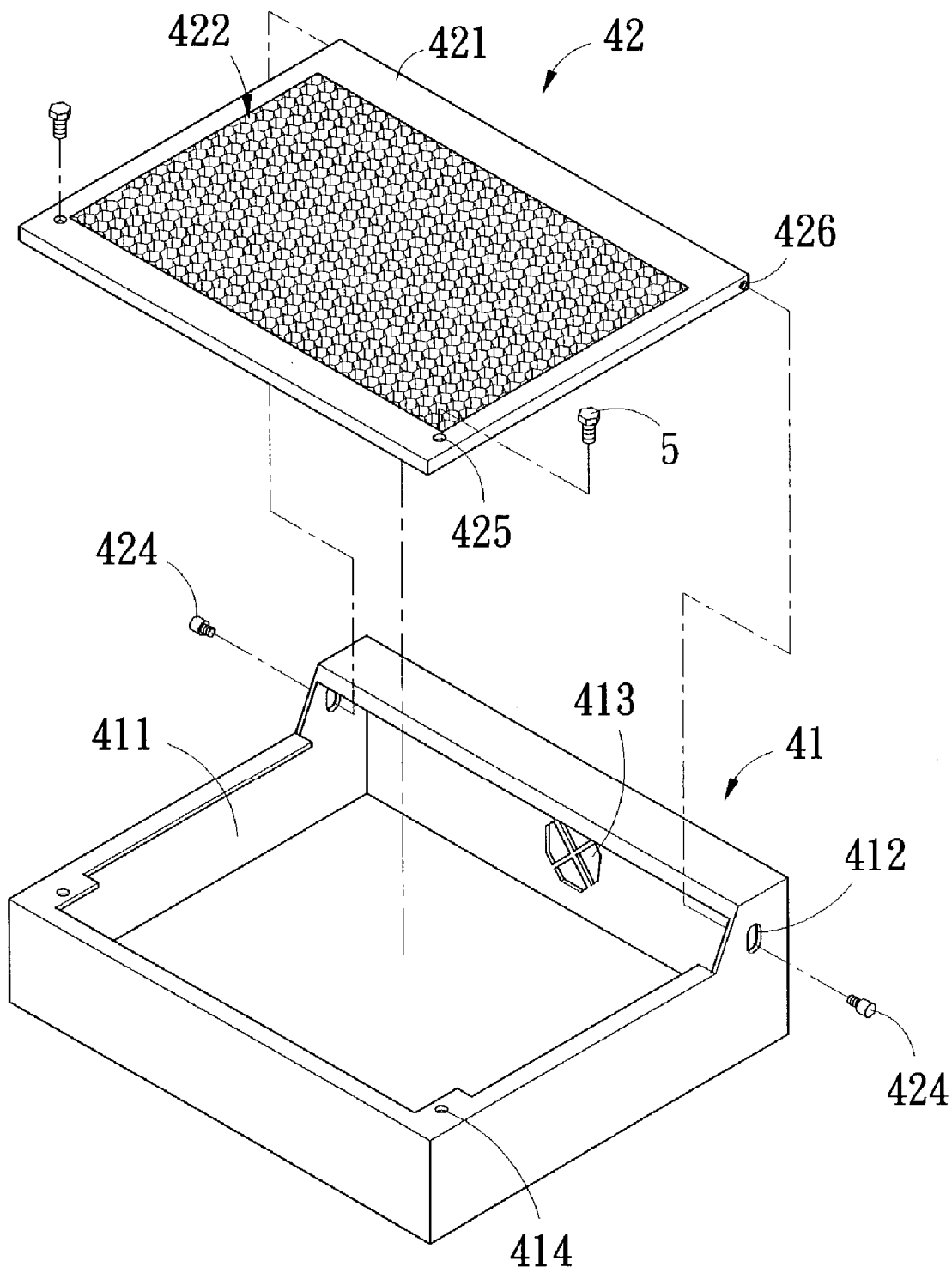
FIG. 3 is an analytic perspective view of the twin-loop dust collector of FIG. 2.
Figure 5:
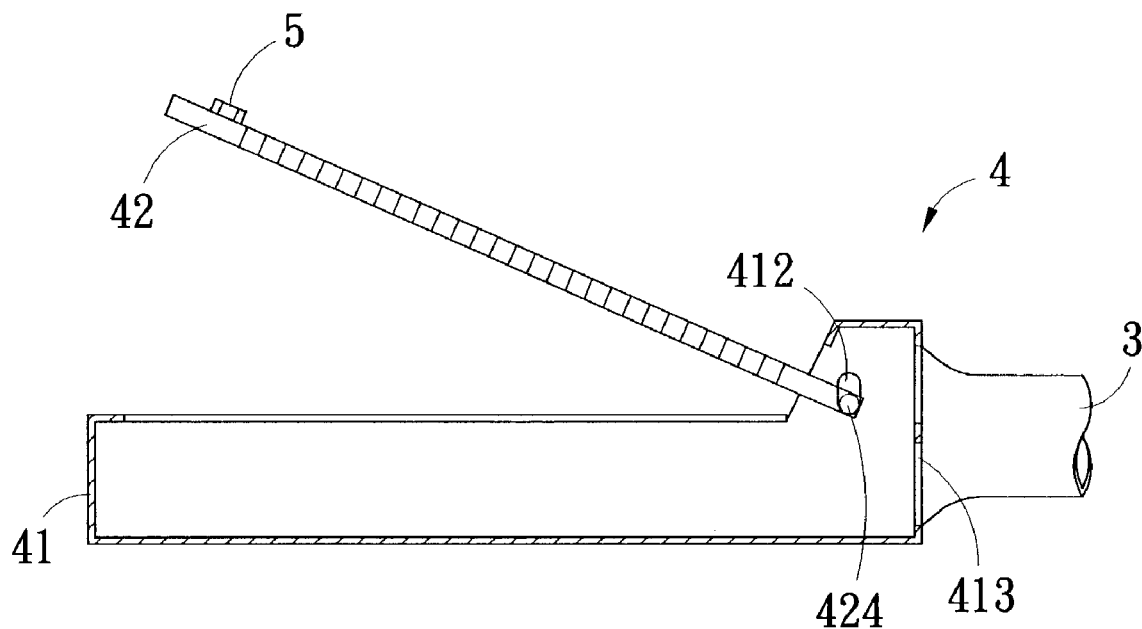
FIG. 5 is a sectional view of the twin-loop dust collector of the present invention.

Referring firstly to FIGS. 2 and 3 showing an embodiment of the twin-loop dust collector 4 of the present invention, the dust collector 4 comprises a case 41 and a net plate 42.

Wherein the case 41 has an opening 411 on the upper side thereof, and two connecting holes 412 are provided respectively on the two lateral sides of the case 41, the rear side of the case 41 has a vent hole 413 for connecting an external air suction tube 3 (as shown in FIG. 5); the case 41 has a plain bottom, the height of the side with the vent hole 413 is larger than those of the other three sides.

The net plate 42 is transversely mounted on the opening 411, and comprises an external frame 421 and a metallic honeycomb plate 422, the external frame 421 has two holes 426 provided respectively on the two lateral sides thereof for extending therein axle bolts 424 to pivotally connect the external frame 421 with the two connecting holes 412 provided respectively on the two lateral sides of the case 41. The net plate 42 can be lifted from the case 41. The net plate 42 and the case 41 are also provided each with two locking holes 425, 414 respectively at the front corners of them; thereby screws 5 can be used to lock the net plate 42 onto the case 41. When in assembling, the vent hole 413 is divided into two areas by the net plate 42. Thus, when the net plate 42 is transversely placed in front of the vent hole 413; such that when suction, is drawn two loops for exhausting air are formed above and below the net plate 42 respectively.

Figure 4:
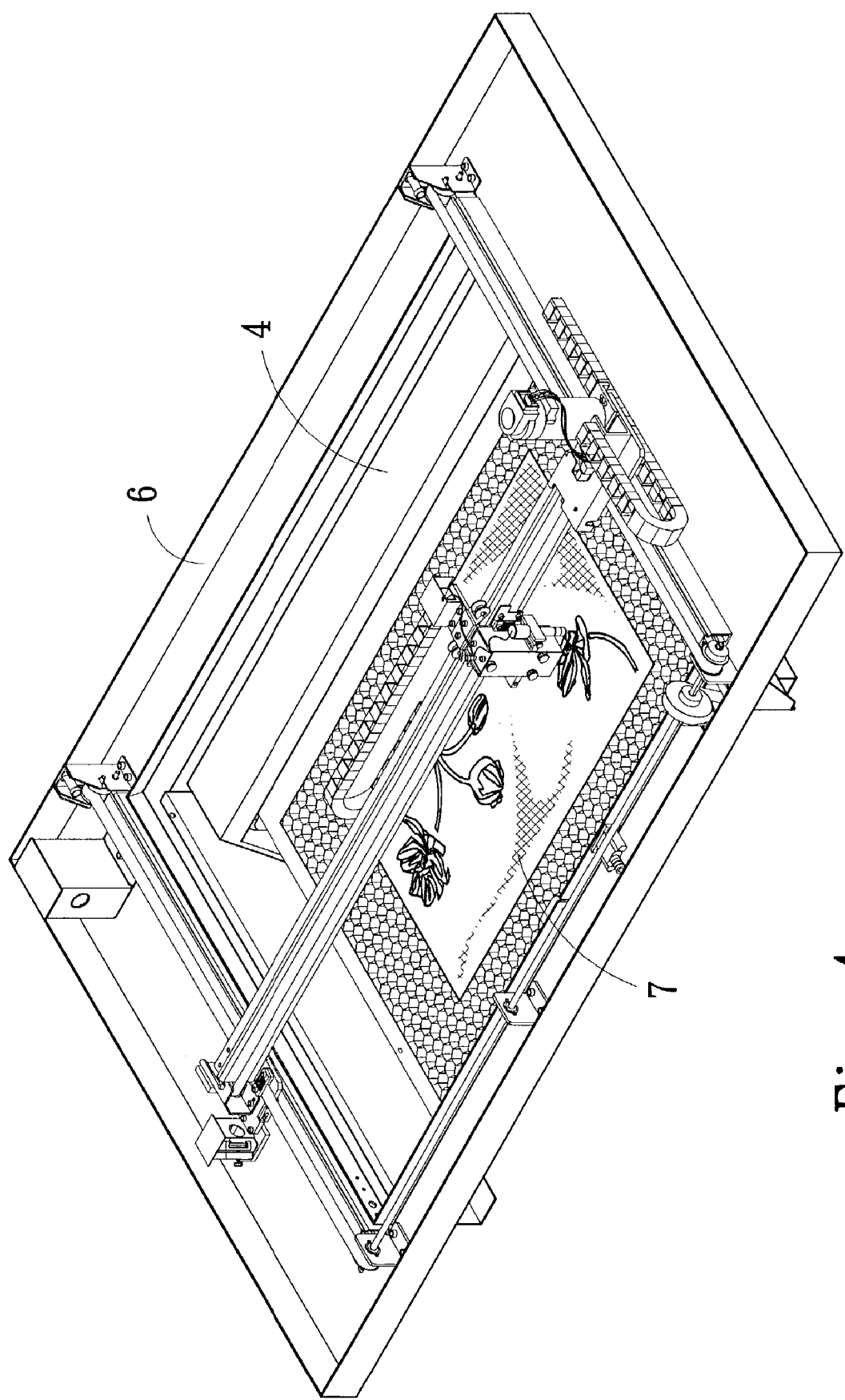
FIG. 4 is a perspective schematic view showing the present invention has been installed in a laser-carving machine.
Figure 6:
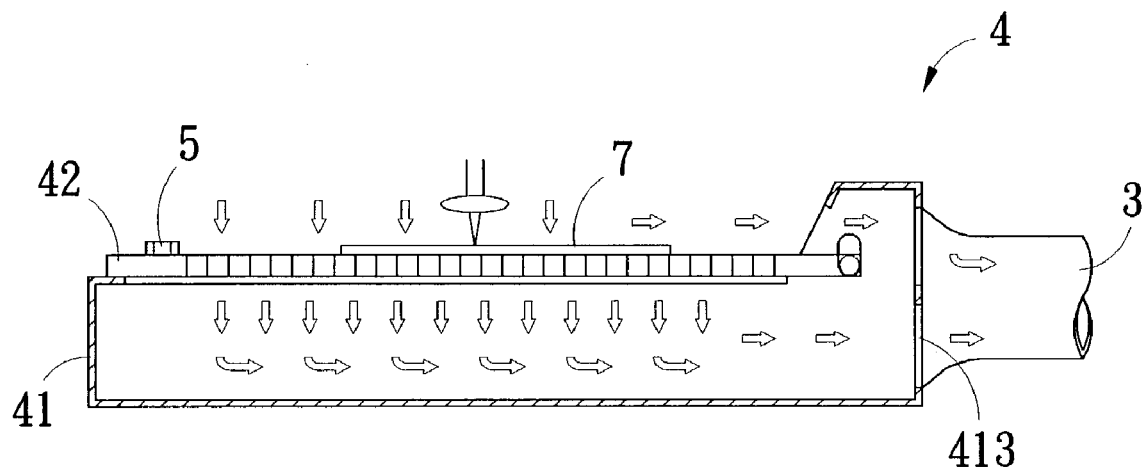
FIG. 6 is a sectional schematic view showing the twin-loop dust collector of the present invention during air drawing.

When in practicing, as shown in FIGS. 4–6, the twin-loop dust collector 4 is installed at a lower area in a laser-carving machine 6, the external air suction tube 3 is mounted on the vent hole 413; in activating the external air suction tube 3, the net plate 42 is transversely placed in front of the vent hole 413, so that the net plate 42 can still generate sufficient negative pressure to suck a work piece 7 thereon when in use, and the waste smoke and dusts generated in cutting or carving the work piece 7 above and below the net plate 42 will be sucked away by the external air suction tube 3. This can get a good effect of smoke exhausting and dust removing; the air flow can pass the cutting point at any time to fast bring away the heat and scraps generated in cutting to thereby reduce the content of dust in the air and to increase the heat sinking effect and effectively lower the temperature during cutting and blow out the small flame created in the scraps; thereby, the surface of the work piece 7 can be prevented from burning and the quality of processing can be increased.

In cleaning the accumulated dusts, by virtue that the net plate 42 is pivotally connected on the rear end thereof with the case 41, when the two lateral screws 5 are removed after processing, the net plate 42 can be lifted for collecting and cleaning up dusts conveniently.

Accordingly, the present invention has the following advantages:

1. The present invention has the vent hole provided at the level of the opening, so that the net plate can divide the vent hole into two areas after it is mounted; and thereby when a suction is drawn, the air above and below the net plate can be drawn out, and the waste smoke and scraps generated in processing above and below the net plate can quickly bring away the heat and scraps generated in cutting to thereby effectively lower the temperature during cutting; thereby, the surface of the work piece of a cloth, a leather or a paper etc. with low ignition points can be prevented from burning.
2. The net plate on the case of the present invention can be lifted, so that the material of the work piece dropped can be conveniently collected, and the wasted dusts can be cleaned up after working.

In conclusion, according to the above disclosed, the present invention surely can get its expected object to provide a twin-loop dust collector able to form an upper loop and a lower loop for exhausting air, it has the effects of scrap discharging, smoke exhausting and fast heat sinking.

Having thus described my invention, what I claim as new, utility valuable and desire to be secured by Letters Patent of the United States are:

1. A twin-loop dust collector, said collector comprises:
    a case having an opening on the upper side thereof, the rear side of said case having a vent hole; and
    a net plate being provided to cover said opening, one side of said net plate being pivotally connected with said case to allow lifting of said net plate, said net plate being transversely mounted to divide said vent hole into two areas; such that when a suction is drawn, a loop for exhausting air is formed above and below said net plate respectively.
2. The twin-loop dust collector as in claim 1, wherein said case has a solid bottom, and the height of said rear side thereof with said vent hole is larger than those of the other three sides thereof.
3. The twin-loop dust collector as in claim 1, wherein said case has two connecting holes provided respectively on the two lateral sides thereof, said net plate comprises an external frame and a metallic honeycomb plate, said external frame has two holes provided respectively on two lateral sides thereof for extending therein axle bolts, said net plate and said case are also provided each with two locking holes respectively on the front corners thereof such that screws are used to lock said net plate onto said case.

* * * * *